UNITED STATES PATENT OFFICE 2,477,158

METHOD OF PREPARING VERATRALDEHYDE FROM OPIANIC ACID

John Weijlard, Westfield, and Max Tishler, Rahway, N. J., assignors to Merck & Co., Inc., Rahway, N. J., a corporation of New Jersey No Drawing. Application February 7, 1947,
Serial No. 727,272

12 Claims. (Cl. 260—599)

This invention is concerned with the preparation of methyl vanillin, an intermediate in the synthesis of papaverin and other organic compounds. More particularly it is concerned with the preparation of methyl vanillin from narcotine, a by-product from the manufacture of morphine.

It is well known in the art that narcotine can be oxidized to form opianic acid and cotarnine. Almost quantitative yields will be obtained if the cleavage is carried out with sulfuric acid and manganese dioxide. The resulting opianic acid can then be converted into methyl vanillin by removing the carboxyl group. The removal of the carboxyl group, however, presents multiple problems due to the proximity of an aldehyde group. It has been proposed to decarboxylate the opianic acid by distilling sodium opianate with soda-lime. The distillation method, while capable of producing some methyl vanillin is not satisfactory due to extensive destruction inherent in dry distillations. Other decarboxylation methods have produced mixtures of vanillin, isovanillin and protocatechuic aldehyde (besides some methyl vanillin) due to lactol formation between the carboxy and the aldehyde groups.

We have now found that the decarboxylation can be carried out successfully if the aldehyde group is protected during the reaction. In accordance with our invention the aldehyde group is first inactivated, and it may be fully restored after completion of the decarboxylation.

The aldehyde group of the opianic acid can be reacted, for example, with aniline to form the corresponding anil. The opianic acid anil can then be decarboxylated in the presence of a catalyst such as copper bronze or the like; the decarboxylation proceeds smoothly at approximately 200° C. and is substantially complete in about 10 minutes. Upon treatment of the decarboxylated mixture with dilute acids, the hydrolysis of the anil takes place, yielding the desired methyl vanillin.

The following examples illustrate a method of carrying out the present invention, but it is to be understood that these examples are given by way of illustration and not of limitation.

Example 1

100 grams purified narcotine were added to a hot solution of 85 cc. concentrated $H_2SO_4$ in 1500 cc. water in a 4 liter beaker. 150 grams precipitated manganese dioxide (82%) were added to the boiling solution as rapidly as the frothing permitted while stirring mechanically. Time of addition 12 minutes. The hot solution was filtered through filtercel and the insoluble washed with some boiling water, then cooled to 2° overnight. The crystals were collected, washed with 5×25 cc. ice water and dried at 50-60°.

63 grams opianic acid (0.3 mole) were dissolved in 300 cc. hot 2B alcohol; a solution of 12 gm. NaOH (0.3 mole) in 300 cc. water was added and the mixture was heated to 70°; 28 grams aniline (0.3 mole) were added, the mixture was stirred 5 minutes at 70°, diluted with 500 cc. water and cooled to 0 to 3°. About 110 cc. 10% HCl were slowly added with fast stirring. The anil precipitation was complete when the reaction was slightly acid to Congo. The product was filtered and washed with 6×50 cc. water until free from chloride and dried at 70-75° at atmospheric pressure until completely anhydrous.

50 grams anhydrous opianic acid anil (0.165 mole) were mixed with 2 gm. copper bronze, melted and held at 195-205° for 10 minutes when the frothing ceased, then cooled.

The entire reaction mixture of crude methyl vanillin anil from the 50 gram run was treated with 500 cc. 5% HCl at 90-95° for one hour. The solution was cooled and extracted with 3×500 cc. ether. The ether extracts were washed with 100 cc. 10% NaOH, then with 100 cc. water, and evaporated to dryness. The residual methyl vanillin had an M. P. 43-44° C.

Example 2

The opianic acid was prepared in accordance with Example 1.

21 grams opianic acid were dissolved in 200 cc. water containing 4.1 grams NaOH by heating to 70° and stirring mechanically. About 9.3 grams aniline were added and the mixture was stirred under reflux at 70-80° for 10 minutes. The solution was cooled to 0°, acidulated under fast stirring by adding about 38 cc. 10% HCl in a thin stream, filtered, washed, dried. Yield 26.1 grams opianic acid anil, M. P. 185-187°.

The opianic acid anil was then decarboxylated in accordance with Example 1.

Example 3

The opianic acid anil was prepared according to Example 1.

30 grams opianic acid anil and 1.5 gram copper bronze were held at 195-205° for 10 minutes. The residue was treated with 250 cc. 5% acetic acid and boiled for 1 hour with stirring. The mixture was cooled and the supernatant liquid was decanted. The soft residue was washed 2-3 times with some water by decantation, then it was treated with a little 5% NaOH to remove acidic compounds, then washed with water. The wet residue was dissolved in 50 cc. ether, the copper removed by filtration and the ether distilled off. The residual methyl vanillin was dried in vacuo.

It is to be noted that methyl vanillin is soluble in 5% HCl in presence of aniline hydrochloride, hence the necessity of ether extractions. The alternate method is based upon the insolubility of methyl vanillin in 5% acetic acid. Thus, the methyl vanillin may be filtered off and only a small amount of ether is required to eliminate the catalyst. The methyl vanillin is also soluble in hot liquid petrolatum; it will however crystallize after cooling and dilution with petroleum ether.

The compound methyl vanillin, also known as veratraldehyde or 3,4-dimethoxybenzaldehyde has the following formula:

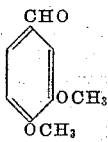

Modifications may be made in carrying out the present invention without departing from the spirit and scope thereof and the invention is to be limited only by the appended claims.

We claim:

1. The process for the preparation of veratraldehyde, comprising reacting opianic acid with aniline to form an opianic acid anil, decarboxylating said anil and hydrolyzing the decarboxylated product.

2. The process for the preparation of veratraldehyde, comprising reacting opianic acid with aniline in the presence of alkali to form an opianic acid anil, decarboxylating said anil and hydrolyzing the decarboxylated product.

3. The process for the preparation of veratraldehyde, comprising reacting aniline with an alkaline solution of opianic acid to form an opianic acid anil, heating said anil in the presence of a catalyst to remove the carboxyl group and hydrolyzing the decarboxylated product.

4. The process for the preparation of veratraldehyde, comprising reacting aniline with an alkaline solution of opianic acid to form an opianic acid anil, heating said anil in the presence of a copper bronze catalyst to remove the carboxyl group and hydrolyzing the decarboxylated product.

5. The process for the preparation of veratraldehyde, comprising reacting aniline with an alkaline solution of opianic acid to form an opianic acid anil, heating said anil in the presence of a copper bronze catalyst to remove the carboxyl group and treating the decarboxylated product with dilute acids.

6. The process for the preparation of veratraldehyde, comprising heating and agitating a mixture composed of aniline and an alkaline solution of opianic acid to form an opianic acid anil, acidifying the reaction mixture to precipitate the anil, heating the anil in the presence of copper bronze catalyst to remove the carboxyl group and hydrolyzing the decarboxylated product with dilute acids.

7. The process for the preparation of veratraldehyde, comprising dissolving opianic acid in a mixture composed of approximately 50% alcohol and approximately 50% aqueous N/1 solution of sodium hydroxide, reacting the opianic acid solution with aniline to form an opianic acid anil, precipitating said anil with acids, heating the anil in the presence of a copper bronze catalyst to remove the carboxyl group and treating the decarboxylated product with dilute acids.

8. The process for the preparation of veratraldehyde, comprising reacting aniline with an alkaline solution of opianic acid to form an opianic acid anil, precipitating said anil with acids, heating the anil in the presence of copper bronze catalyst to remove the carboxyl group and treating the decarboxylated product with 5% hydrochloric acid.

9. The process for the preparation of methyl vanillin, comprising reacting aniline with an alkaline solution of opianic acid to form an opianic acid anil, precipitating said anil with acids, heating the anil in the presence of copper bronze catalyst to remove the carboxyl group and treating the decarboxylated product with 5% acetic acid.

10. The process for the preparation of veratraldehyde, comprising reacting aniline with an alkaline solution of opianic acid to form an opianic acid anil, precipitating said anil with acids, heating the anil in the presence of copper bronze catalyst to remove the carboxyl group, dissolving the decarboxylated product in a 5% hydrochloric acid and extracting the acid solution with ether to recover the veratraldehyde.

11. The process for the preparation of veratraldehyde, comprising reacting aniline with an alkaline solution of opianic acid to form an opianic acid anil, precipitating said anil with acids, heating the anil in the presence of copper bronze catalyst to remove the carboxyl group, treating the decarboxylated product with 5% acetic acid, decanting the acid solution and dissolving the residue in ether to separate the veratraldehyde from the copper catalyst.

12. The process for the preparation of veratraldehyde, comprising reacting aniline with alkaline solutions of opianic acid to form an opianic acid anil, precipitating said anil with hydrochloric acid, heating the anil to a temperature ranging from 195° to 205° in the presence of copper bronze catalyst to remove the carboxyl group, hydrolyzing the decarboxylated product with dilute acids and recovering the veratraldehyde with organic solvents.

JOHN WEIJLARD.
MAX TISHLER.

REFERENCES CITED

The following references are of record in the file of this patent:

UNITED STATES PATENTS

| Number | Name | Date |
|--------|------|------|
| 1,999,181 | Conover et al. | Apr. 30, 1935 |

OTHER REFERENCES

Beckett et al., "Chemical Society Journal" (London), 1876 (I), pages 287–291.

Beilstein, vol. VIII (1925), page 255, citing Bouveault, "Compte rendu de l'Academie des Sciences," 122, 1544.